INVENTORS
EARL E. MASTERSON
FRANK H. SCHALLER
BY
John J. McCormack
ATTORNEY

INVENTORS
EARL E. MASTERSON
FRANK H. SCHALLER
BY
John J. McCormack
ATTORNEY

INVENTORS
EARL E. MASTERSON
FRANK H. SCHALLER
BY
John J. McCormack
ATTORNEY

RECORD INPUT/OUTPUT APPARATUS

Filed July 19, 1965

5 Sheets-Sheet 4

INVENTORS
EARL E. MASTERSON
FRANK H. SCHALLER
BY
John J. McCormack
ATTORNEY

INVENTORS
EARL E. MASTERSON
FRANK H. SCHALLER
BY
John J. McCormack
ATTORNEY

United States Patent Office 3,416,788

Patented Dec. 17, 1968

3,416,788
RECORD INPUT/OUTPUT APPARATUS

Earl E. Masterson, Newtonville, and Frank H. Schaller, Needham Heights, Mass., assignors to Honeywell Inc., Minneapolis, Minn., a corporation of Delaware Filed July 19, 1965, Ser. No. 473,120
23 Claims. (Cl. 271—3)

ABSTRACT OF THE DISCLOSURE

A card-handling machine having IN/OUT hoppers (and intermediate handling elements) arranged in "triangular relation," the hoppers being kept close to a common working level and one being tilted and converged toward the operator for better accessibility, the IN hopper being so tilted as to pre-aim cards toward an eject station, thus also shortening the inter-hopper card path, both vertically and horizontally. This arrangement also facilitates providing a document handling top surface tilted toward the operator for easier access to more working surface.

A general object of the present invention is to provide new and improved data processing apparatus for handling unit records, especially records of the punched card type. More specifically, the invention relates to unit record handling apparatus which is characterized by a novel arrangement of input and output record hoppers whereby the hoppers are located close to a common level and are oriented in convergent relation with one another.

Manipulation of unit records, such as punched cards, is often required in the operation of a data processing system. For instance, a card reader commonly is used to supply data to a computer by sensing the "hole-encoded" information recorded on punched cards. At present, card readers and other such unit record handling apparatus are much too slow and constitute a major obstacle to increasing overall data processing speeds. Thus, workers in the art have long been interested in improving the speed of card readers and other record handling apparatus. One cause of slow card-handling relates to operating convenience.

Convenience of operation is significant for unit record handling machines which, more than most other data processing sub-systems, require a good deal of operator attention. For instance, operator intervention is required to stack cards into the input hopper, to remove them from the output hopper (stacker), to transfer cards between hoppers and to monitor and manipulate controls on a control panel. Therefore, it is of surpassing importance to design a unit record handling machine to be operated with a minimum of operation time and effort. For example, it is very advantageous to locate operating stations, controls, and record stacks within easy reach of a stationary operator and to be visible from a single operator position. Prior art machines have exhibited many shortcomings in this respect however. Some have spaced the input hopper so far laterally from the output hopper that an operator cannot reach from one to the other without either straining or walking back and forth. With some designs, an operator standing adjacent one hopper cannot even see the other hopper, the controls, or both. In some machines, one or both hoppers are inconveniently located vertically, one or both being so high, or so low, as to require unnecessary reaching, stooping or lifting motions by the attendant. It will be appreciated that such prior art arrangements needlessly slow down and fatigue the machine attendant, often a frail girl, and inhibit her efficiency.

The present invention responds to these shortcomings in "operator-convenience," providing a simplified, convenient arrangement of input and output hoppers, locating them close to a common vertical (waist) level and compacting them laterally so that an operator can service both from one position, without moving, reaching or lifting. Lifting cards up into input hoppers is obviously to be avoided, though relatively common in the art (see FIGURE 1). The invention also provides a more compact card-handling apparatus, and one with a lower silhouette, by arranging parts so that, for instance, an operator can reach all controls, all working surfaces and both card magazines (input and output) from one "home" position, this position also being optionally located in front of, or behind, the machine. The invention, thus, greatly reduces operator fatigue, simplifying required manipulative movements and giving her improved vertical accessibility and much closer control over both the machine and the documents handled.

The invention optimizes lateral accessibility by another novel feature comprising a triangular convergent arrangement of input and output hoppers. That is, card hoppers are disposed so that their alignment directions (i.e. direction of card-movement) converge to compact the machine and improve intra-hopper card translation. Thus, a "delta," or cross-sectionally-triangular machine configuration is derived, the converging hoppers of which are readily located close to a common vertical level (as prescribed above) and allow an operator to stand closer to the lateral operating center of the machine, thus reducing lateral reaching, stretching, etc. This improved lateral accessibility together with the aforementioned vertical accessibility will be seen to improve the speed and efficiency of card handling, bringing control points closer to the operator as well as "compacting" the overall machine.

Stated otherwise, the invention provides a card handling device wherein the input and output stacks of cards may both be reached by an operator standing in one position without any extreme reaching or moving, either laterally or vertically; the input and output hoppers being brought closer together in a convergent "delta" relation and located close to a common vertical level. Thus, a novel "delta" machine design can be employed to place the operator much closer to the focus of machine control-points.

The above common height and convergence of hoppers also facilitates improved intra-machine card transport. As explained hereinafter, this "delta" arrangement shortens and straightens required transport paths and facilitates tipping the input hopper to pre-aim cards toward the eject station. For instance, prior art card-handling machines which can feed cards "broadside" and process them serially have commonly required bending cards about at least two ninety-degree turns. The invention can allow reducing this from about 180° to about 45° total required card-turn. It is recognized that shorter, straighter transport paths will desirably lead to quicker, more reliable card transport. More particularly, it is very desirable to eliminate stops and sharp turns therein, since these necessarily slow down card throughput and also damage the cards by flexing or abrading them.

It is also recognized that one preferably picks and stacks cards "broadside," that is along their short dimension, to minimizes nagging of adjacent cards due to interlocking of their perforations. On the other hand, it is also preferable, for reasons of economy, simplicity of parts, etc., to process (e.g. read or punch) a card serially, that is along its long dimension. For example, serial reading may require only twelve photoelectric transducers whereas parallel reading would require as many as eighty. While some prior art card handling systems have proposed card handling methods which minimized pivoting stopping and card-flexing operations, none of these has been specifically compatible with this desirable "broadside-feed/serial-process/broadside-stack" handling made for various reasons. Conversely, some broadside-serial-broadside transport methods have even required flipping cards over (180° turn)—a hopelessly time-consuming, complex operation. The present invention proposes a card handling arrangement which greatly reduces the necessary card-manipulations along a transport path, being compatible with a "broadside-feed, serial-process, broadside-eject" transport mode, and also reducing path length. Thus, it is an object of the invention to provide such card-handling apparatus, whereby card-transport is simplified and improved as well to operator accessibility. That is, the present invention provides an arrangement of input and output hoppers which facilitates faster card-handling and also is more convenient to operate.

Thus, it is a particular object of the present invention to provide new and improved unit record handling apparatus wherein means are provided for tilting hoppers obliquely to one another so that cards may be transported from an input station to an output station with no pivoting or stopping of the card required, but only a gentle flexure of the card, diverting it by an acute angle. Another object is to provide such apparatus having convergent, relatively common level hoppers for improved operator accessibility from one position, front or back; and for improved, simplified card transport there-between, especially for broadside-serial-broadside transport modes.

The invention also serves to shorten and straighten-out transport paths by providing a tilted "V-shaped" input hopper which "pre-turns" input cards, pointing them toward an output destination, such as the ejection means which feed the output hopper. It will become apparent that such tilting is also compatible with "broadside IN/OUT-serial process" transport modes. More particularly, when combined with the above-mentioned hopper convergence feature, tilting the input hopper can straighten the transport paths in an unobvious manner. For instance, by merely pivoting an input hopper (e.g. hopper I', FIGURE 2) about 45° to converge toward the output hopper (hopper O) and also maintaining its base inclined to keep the vertical axis of stacked cards parallel with that of cards at the eject station, one can reduce the total necessary transport turns from 180° to a mere 45°, according to the invention.

It will be recognized that a function of input hoppers in card handling machines is to receive packets of cards and direct them in a prescribed attitude toward card-selection means (e.g. a card picker). Ideally, such input hoppers allow the operator to inject card packets with a minimum of effort or skill, and also serve to automatically advance and pre-align the cards somewhat for picking. However, prior art card hoppers have employed card-aligning and card-advance mechanisms which fail to satisfy the above objectives and are relatively complex and inconvenient to use. For instance, as best appreciated from FIGURE 1, prior art input hoppers have commonly been provided with card-aligning guides (e.g. the sides 11, 11' forming chute 1 in FIGURE 1) that force the attendant to employ a marksman's skill to insert a packet of cards and also precisely pre-align them. Prior art input hoppers have also failed to urge cards into alignment along both their length and height dimensions without resorting to cumbersome devices such as stack jogglers, for shaking the entire card stack (note joggler 14 in FIGURE 1). The present invention dispenses with such guide chutes, stack jogglers and other such complex and inconvenient mechanisms by employing simply an inclined platform with a single guide rail for the input hopper.

Tilting a hopper according to the invention also improves accessibility thereto and allows one to load it more quickly and conveniently, especially when one siderail is also eliminated, according to the invention. It will be recognized that the input hoppers in prior art card-handling machines are inconvenient both for inserting card-stacks generally and particularly for inserting a few cards at a time. That is, since prior art input hoppers customarily comprise a chute (as noted above) which requires pre-alignment of cards for insertion therein, they commonly require a separate joggle deck on which the operator can so pre-align the cards into a "dressed" stack. These problems disappear when using the input hopper design according to the invention whereby the hopper is tilted and one siderail is eliminated, to thereby "open-up" the hopper for unobstructed access thereto, with no need to "aim" cards, pre-align them, etc. The invention thus makes it especially convenient to transfer cards between input and output stacks, e.g. for rereading. The "V" hopper resulting from this tilting and side-removal sacrifices no aligining capabilities, but conversely makes the inserted cards self-aligning in two directions.

This tilting feature can be optimized by also inclining the tilted hopper vertically so that inserted cards will be gravity-urged to slide down the hopper and engage picker means. This inclination helps to render cards self-aligning along the input hopper axis also, i.e. to be coplanar with the "picking-plane." Hopper inclination also extends the surface area of hopper-to-card engagement for improved card braking and control whereby the gravity-fed cards are continuously and gradually advanced. The latter feature helps dispense with the need for buffer stations which are commonly used (e.g. station 15 in FIGURE 1). These buffer mechanisms are commonly necessary for prior art input hoppers to reduce and normalize the card-feeding forces, urging cards against the picker means. However, such buffer means are relatively complex and especially inconvenient to use, giving very poor access to cards adjacent the picker means. For instance, the input buffer station 15 in machine 10 (FIGURE 1), while necessary to reduce the force of stack against picker 13, makes it virtually impossible to insert cards therein, thus making single-card feeding very difficult. The present invention dispenses with buffer stations and "opens-up" input hoppers for access thereto by the novel "V-shaped" inclined hopper configuration which affords self-normalizing card-to-hopper engagement. Thus, it is an object of the invention to provide a record handling apparatus characterized by an inclined, "V-shaped" card-input hopper.

According to a related feature, the inclined base surface of the tilted hopper is extended toward the output hopper to constitute an inclined machine surface, e.g. a working table for card joggling, for mounting machine controls, and the like. Such an inclined surface both opens-up access to the associated hopper, making it coplanar with the work surface, and brings more machine elements closer to the operator. Thus, another object of the invention is to provide such a hopper having a base portion comprising an extension of an inclined top surface of a card handling machine.

Operating convenience is further enhanced by another feature relating to hopper tilting, namely provision of a pivotable hopper siderail, the pivoting of which can effect the automatic conversion of the machine to handle different card sizes.

Thus, many problems are resolved by tilting a hopper portion of a record processing machine according to the invention; and especially by also vertically inclining the tilted hopper. Thus, it is an object of the invention to provide an arrangement whereby record input and output hoppers are arranged to be triangularly convergent, to be at a relatively common height and also to be relatively tilted somewhat for parallel vertical alignment at injection and ejection stations. Another object is to provide such an arrangement wherein the tilted hopper is also inclined vertically downward for improved accessibility and feeding efficiency. Another object of the invention is to provide such an arrangement wherein the hopper base is extended to form a coextensive inclined working surface on top of a machine. Yet another object of the invention is to provide a unit record handling apparatus having a more accessible and conveniently arranged input hopper.

The foregoing objects and features of novelty which characterize the invention as well as other objects of the invention are pointed out with particularity in the claims annexed to, and forming a part of, the present specification. For a better understanding of the invention, its advantages and specific objects attained with its use, reference should be had to the explanations associated with the accompanying drawings, in which there are illustrated and described preferred embodiments of the invention.

The foregoing objects of the invention are achieved by the provision of a pair of input and output hoppers which converge laterally to form a relatively triangular hopper layout common height alignment of injected and ejected cards; which are disposed adjacent a common height; one hopper being tilted to form a V-shaped receptacle having orthogonal base portions with no side portions; and other input hopper features whereby the lateral and vertical access to both hoppers by an operator is facilitated, front and rear, and whereby the inter-hopper transport path is shortened and straightened.

Figure 1:
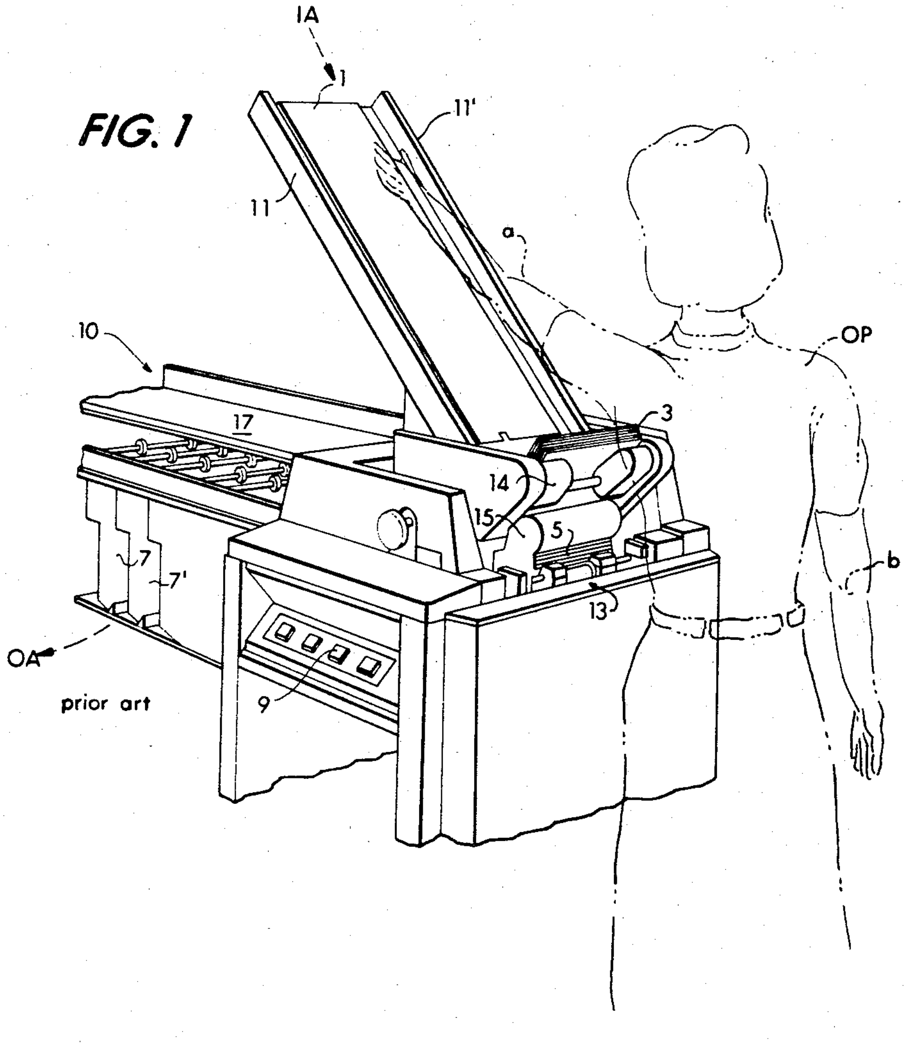
FIGURE 1 is a schematic perspective view of a typical prior art unit record handling apparatus.

FIGURE 1 shows a typical prior art unit record handling machine, i.e. a card reader 10, illustrating some prior art problems which are met by the invention. It will be recognized that card reader 10 includes an input station comprising a picker mechanism 13 arranged to engage cards fed along input axis IA of a card injection means comprising input hopper 1. Hopper 1 is arranged to receive an input card stack 3 and leads to a buffer station 15 containing an intermediate card stack 5, directly engaging picker 13. It will be recognized that input hopper 1 has a pair of side portions 11, 11' spaced to closely surround the edges of cards of a given length for prealignment purposes. A card joggler 14 is also provided for pre-picking alignment. Thus, the operator, or machine attendant OP, must select a stack of cards, manually prealign them (e.g. on a work table 17), reach upwardly (depending on length of stack 3) and carefully aim the stack for insertion between sidewalls 11, 11'. The cards are transported and processed within machine 10 to be delivered along an output, or stacking, axis OA at a plurality of output hoppers, or pockets 7, 7'. It will be noted that the cards in the output hoppers are deposited to rest along a different (bottom) edge than those in the input stack 3 or in buffer stack 5 and thus have to be flipped or pivoted, about a turn of at least 90° along the transport path between hoppers 1 and 7, 7'. The intra-machine card manipulation, processing etc. may be controlled through a keyboard on a control panel 9 by attendant OP.

This above will be seen to illustrate a common hopper arrangement which is relatively slow, inconvenient and unnecessarily fatiguing for an attendant to service, for instance because of the vertical and lateral space between operative elements, such as hoppers 1, 7, controls 9 and table 17. For instance, obvious exertions are required of an attendant, stretching upward and outward, to pile stacks of cards into input hopper 1, first having joggled the stack on table 17 and then walked around to the position shown. Further, the attendant must aim the stack carefully to fit between sides 11, 11'; must strain, or move around the machine, to monitor or manipulate control panel 9; and must thereafter move around the machine and stoop downward to inspect or retrieve processed cards in output stacker hoppers 7, 7'. This servicing procedure is a time-motion study in actions which are as fatiguing as they are unnecessary. It is virtually impossible for the operator of such a card-handling machine to position herself in any single position from which she can load cards into hopper-chute 1, can monitor control panel 9, can use table 17 and can manipulate cards in output stackers 7, 7' without straining or moving. Thus, seated operation is ruled out, for instance. In addition to this inconvenient lateral layout, FIGURE 1 also illustrates an inconvenient vertical layout that is unfortunately prevalent in the art. The upward and downward reaching, stooping and lifting this arrangement imposes on an operator in the course of handling cards in the input and output hoppers is obviously undesirable, detracting from her efficiency and speed, while also unnecessarily tiring her.

Illustrative card-handling machine 10 discloses another associated difficulty exhibited by conventional input hoppers, namely "hopper-inaccessibility." Input hopper 1 typically has a pair of sidewalls 11, 11' spaced little more than a card-length apart to align the cards prior to their being fed to picker 13. Workers in the art will recognize that such a typical "card-chute" is problematical to load, since closely-spaced walls 11, 11' require that, when an operator grips a stack of cards to insert them into the hopper 1, she must be sure that their side-edges are in relatively close registration so as to fit between walls 11, 11'. As before-noted, this requires that the operator joggle or align the card deck, a fussy, interruptive step in computer operation that requires two hands, takes time, etc. For joggling purposes, it is also customary to provide a joggling table 17 in prior art machines. It would be preferable, of course, to dispense with the need for both this joggling step and the associated work surface. The invention improves vertical layout and hopper accessibility as seen below, and also alleviates the need for card-joggling.

Figure 2:
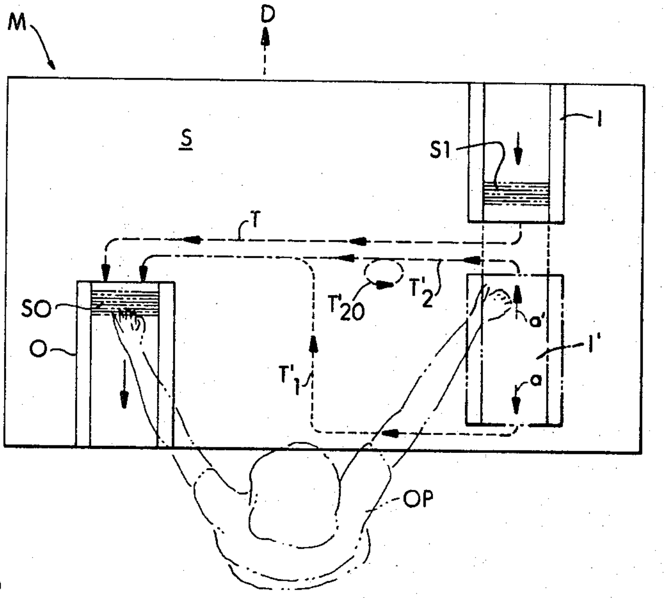
FIGURE 2 is a schematic plan view of a record handling apparatus having a hopper arrangement which illustrates some of the problems associated with the invention.
Figure 3:
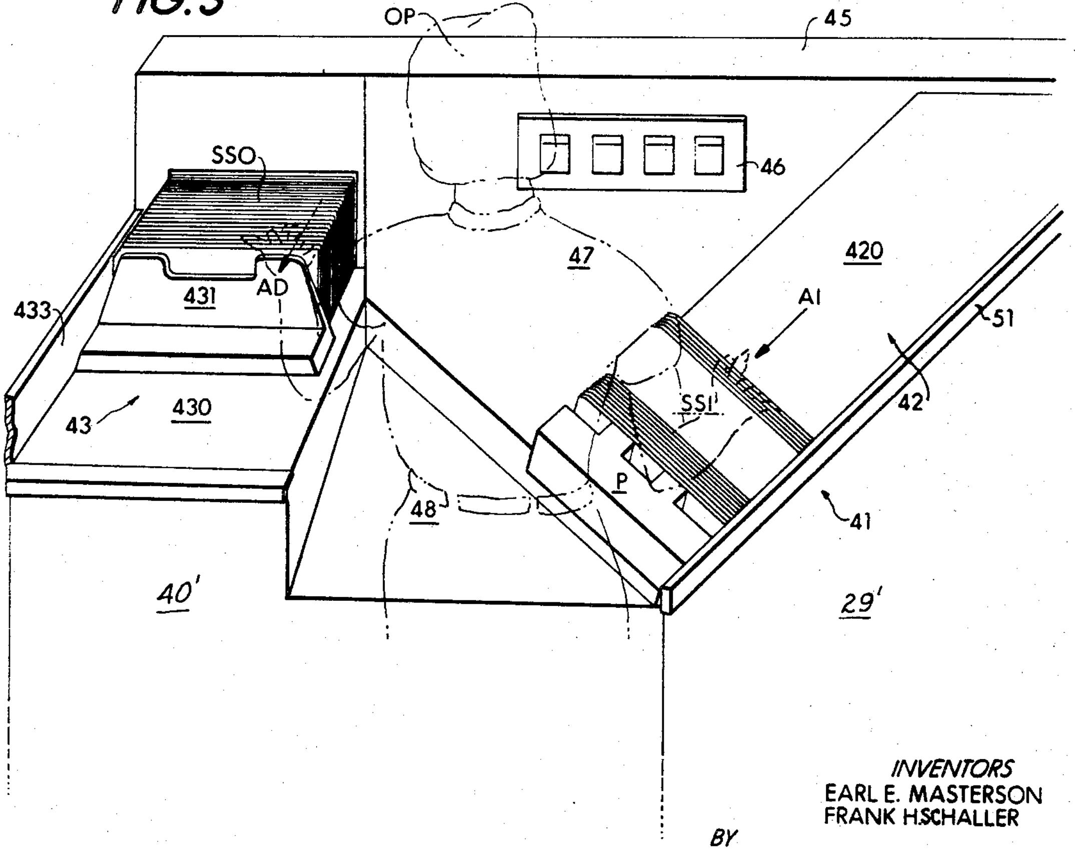
FIGURE 3 is a front perspective view of a card reader embodiment of the invention shown in relation to the physique of a typical human operator (in phantom)

In an effort to avoid the above-mentioned shortcomings of prior art card-handling machines, it appeared desirable to locate both the input and the output hoppers so that the card stacks therein lay along hopper bases that are relatively coplanar. A plan view of such an arrangement (over-simplified) is indicated in FIGURE 2, wherein surface S is intended to schematically represent a top surface of a card-handling machine M on which are located an input hopper 1, containing a stack of cards SI, and an output hopper O, containing a stack of cards SO, the cards of both hoppers being arranged to be transported in the directions indicated by the arrows. Thus, surface M is coplanar with the bases of hoppers I and O so that all are close to a common (e.g. waist) level for access by attendant OP, unlike analogous elements 17, 7 and 1 respectively of the machine 10 in FIGURE 1. It will be perceived that this arrangement also allows a relatively simple and direct transport path *t* between hoppers.

However, a disadvantage is that machine M is relatively deep (along direction D) and bulky, and also prevents operator OP from reaching cards located in the remote ends of both hoppers from a single position, i.e. without moving or straining considerably.

As a modification of this arrangement, therefore, it appeared that one might bring the input hopper I closer to the operator, as shown in phantom at I', so as to bring both card stacks SO and SI, within easy reach. However, this arrangement has disadvantages in that it sets up alternate transport paths T'1, T'2, both of which require turning transported cards through a total of 180° something to be avoided, if possible, since every sharp (e.g. 90°) turn can damage cards and slow them down, reducing card throughput speed. That is, if stack SI faces in one direction (arrow $a$), cards must be transported along path T'1 which traverses two 90° turns and also is undesirably long. Facing stack SI in the opposite direction (arrow $a'$) to be transported along path T'2 is no solution since their order will be reversed in transit between the two hoppers unless the cards are flipped over (a 180° turn, indicated at loop T'20). A machine designer will avoid this very cumbersome, problematical "card-flipping" manipulation if he possibly can. The above-mentioned problems associated with other card-handling structures are largely resolved using an improved arrangement as shown in FIGURES 3–8.

FIGURES 3–7 illustrate one embodiment comprising a unit record handling machine of the card reading type for sensing data from punched-card records. The cards are to be loaded in stacks into card reader 41 by an operator OP at an input hopper 42. From hopper 42, the cards are separately selected (picked) by a picker P, to be transported past a card processing station (e.g. reading station R, FIGURE 4) and thereafter, to be ejected and stacked along an output container, or stacking platform, such as in output hopper 43. It will be seen that the general horizontal cross-sectional outline of the card-reader apparatus 41 is relatively triangular. This "delta" shape places within easy reach of operator OP (positioned as shown) all of the cards stacked in both hoppers 42, 43, plus the inclined work-surface portion 44 therebetween and the control panel 46 mounted on surface 47. As noted particularly in FIGURES 3 and 7, machine 41 is defined between a pair of oblique sidewalls 29', 433' (433' may be lower extension of hopper rail 433) to assume this "delta" configuration, together with rear wall 45' (under shelf 45), there also being a relatively short forward wall 40' connecting sidewalls 29', 433'.

Figure 4:
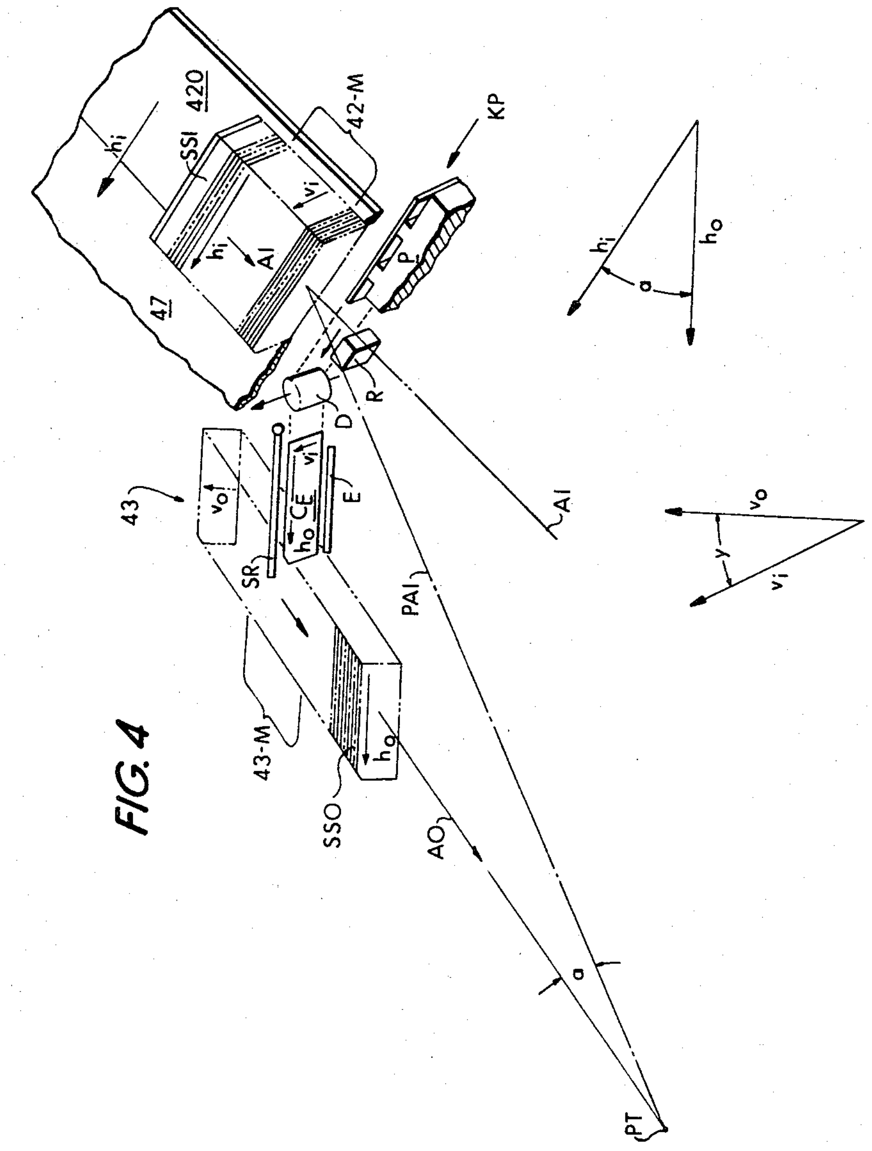
FIGURE 4 is a schematic representation of the card-advancing and storage portions of the embodiment in FIGURE 3.

Thus, card reader 41 comprises an input hopper portion 42, an output hopper portion 43, a pair of working surfaces between the hopers, namely a level shelf 48 and an inclined working surface 47. Input hopper 42 includes an inclined base portion 420 and a rail portion 51. Output hopper, or stacker 43 includes a flat, level base portion 430, a sidewall 433 and an associated card pusher means 431. Table 47 may preferably be coplanar with the base 420 of input hopper 42 and carries control panel 46. Working surface 47 is inclined upwardly to intersect a level top shelf portion 45 at the rear of reader 41. As will become more apparent hereinafter, these elements of reader 41 are functionally adapted to process cards as follows: Operator OP may initiate reader 41 in a particular mode by selecting proper controls on panel 46 and inserting stacks of subject cards into input hopper 42, for instance, selecting the cards from an adjacent receptacle, or from shelf 48 or output hopper 43. When processing is initiated, picker P is caused to thrust individual cards sequentially from an input stack SSI in input hopper 42 toward internal transport means to be advanced serially, i.e. short-edge first, past a reading station R (see FIGURE 4) and thence to an eject station, from which an ejector means (E, FIGURE 4) may thrust them to be stacked in an output stack SSO, along output hopper 43. As FIGURE 4 shows, a stack roller means SR is provided to direct cards between ejector E and output stack SSO, also straightening them from their tilted, or inclined attitude. That is, input hopper base 420 has been tilted (e.g. about 45°) relative to output hopper base 430 to define a plane of vertical inclination. Cards are preferably maintained inclined at this reference inclination until ejection, i.e. the height axes, or height (relatively vertical) dimensions thereof are controlled so that the height axis $v_i$ of injected cards is kept parallel between input hopper 42 and ejector E. Dimensional axis $v_i$ is inclined preferably at about 45° (angle $y$) from that of cards in output hopper 43, namely axis $v_o$. Such a vertical inclination provides a gravtiy feed for injected cards making them self-injecting along input hopper 42 toward picker P.

According to one feature of the invention, hoppers 42, 43 are at a relatively common height, that is, at least some portions thereof intersect a common vertical level, or lie closely adjacent thereto. Thus, stacker base 430 may be level with the floor which supports machine 41, while the midsection 42-M of the inclined base 420 of hopper 42 may be disposed to intersect the plane of base 430. Stacker base 430 will thus define a reference plane which is preferably at a "waist-level" for the typical operator (standing or seated) and provides numerous advantages such as vertical accessibility, as above related. It will also be noted that hoppers I, O of machine M in FIGURE 2 have coplanar, preferably waist-level, base portions. It will be apparent that such coplanarity brings machine elements into better relation with an attendant improving their vertical accessibility.

CONVERGENCE

According to another feature of the invention, hoppers 42, 43, besides being coplanar, also converge adjacent operator OP in a triangular arrangement. That is, the hoppers are arranged so that the directions along which the cards therein (i.e. directions PA1, AO of card stacks SSI, SSO respectively—FIGURE 4) move relatively oblique and convergent toward, or alternatively divergent from a common point PT adjacent operator OP. Thus, hopper axes AI, AO are arranged (arrows) to assume directions which converge, or "focus" at point PT, being separated by convergence angle $a$. Convergence angle $a$ is preferably about 45°. Otherwise, defining this convergent "focused" relation, it will be understood (see FIGURES 3, 4) that a projection PAI of input axis AI in the plane of stacking platform 430 intersects output axis AO at a "focal" point PT somewhat adjacent the waist of operator OP. It will be recognized that this converging hopper relation defines the above-described "delta" or triangular machine cross-section. This "delta" arrangement compacts machine elements laterally and thus improves the lateral accessibility of stacked cards, controls, etc. to the operator, as aforesaid. It will be recognized that the input and output cards (in stacks SSI and SSO) will thus face toward, or away from a common point (along arrows AI, AO toward PT, FIGURE 4—see also FIGURES 7, 8). The effect upon card orientation in transit of making the hopper so converge is seen by observing the orientation of the long horizontal card dimensions (or axes $h$) in the input hopper ($h_i$) and the output hopper ($h_o$). As schematically indicated, dimension $h_i$ is skewed from $h_o$ by angle $a$, since $h_i$ and $h_o$ are normal to hopper directional axes AI, AO, respectively. However, drum D diverts the cards from direction $h_i$ into direction $h_o$ whereas their vertical inclination $v_i$ is not corrected until later, i.e. by stack roller SR fed by ejector E.

Figure 7:
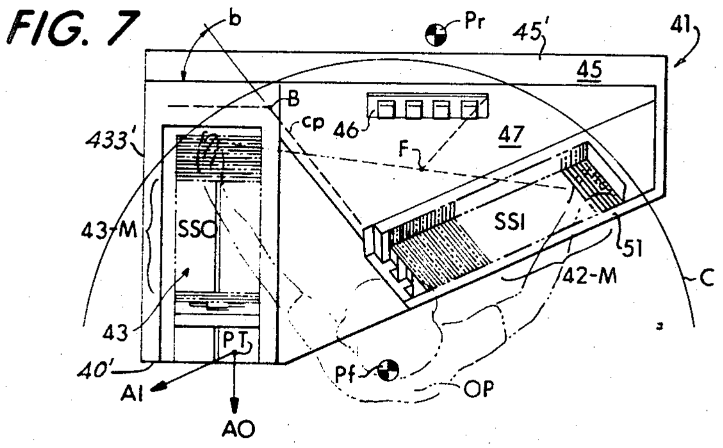
FIGURE 7 is a schematic plan view of the embodiment of FIGURE 3.

A resultant lateral compacting of reader 41 is achieved by this hopper convergence, as seen in the top view of FIGURE 7. This hopper arrangement allows a "delta-shaped" layout of the overall machine, permitting an operator OP to assume a number of convenient working positions $P_f$ in front of machine 41 from which her ambit (i.e. the arcuate path C, defining her extreme reach) will readily embrace all the working zones, or operative areas, of the machine, such as stacks SSI, SSO, controls 46 and working surface 47. A second similar set of operating positions $Pr$ may be found adjacent the rear of reader 41 from which a similar ambit-arc (like C) may be drawn to embrace all of these working zones. Such a machine design may be characterized as "bi-directional", i.e. operable from two directions. Thus, it is important that this arrangement allow operator OP to reach the most remote cards (last in order) in stacks SSO and SSI, especially when input stack SSI is relatively full. In other words, the "delta" arrangement allows the operator to stand (or sit) in one or more positions ($P_f$, $P_r$) which are spaced a minimum distance from the "operating focus" F of the machine. This focus F may be defined as the center of origin of minimum radii to extreme manipulation zones, such as controls 46, surface 47, etc. Thus, operating zones are arranged according to this feature to radiate from this "operating focus" $P_f$ in the manner of "spokes from a wheel-hub"; for instance, the working length of input stack SSI, the working portion of the output stack SSO and intermediate working surface portions (including panel 46) being so arranged, and thus falling within easy arm-reach of the operator.

This compacting "focused" hopper layout also improves intra-machine transport modes, by straightening and shortening the required inter-hopper transport path *cp* (FIGURE 7), as aforementioned. It is evident that the "delta" hopper arrangement places the picker means P relatively closer to the ejector E, feeding output hopper 43. Thus, hopper 42 is oriented so that "picked-cards" therein are aimed substantially toward the eject station (along path CP), to which they may be translated without disturbing their inclination. It should also be appreciated that transport path *cp* is also rendered free of sharp (i.e. about 90°) turns, requiring only a single gentle bend (B) which may preferably be about a bend angle (*b*) (card-flexure angle) of approximately 45°. This bend may preferably be traversed by directing cards about the circumference of a pivot drum D (FIGURE 4) sufficiently large to flex them gently and gradually around the 45° turn. Drum D preferably will divert cards acutely to assume slightly (less than 90°) different directions in both the vertical and horizontal directions; sending them to ejector E. This two-directional diversion shortens and simplifies card travel as seen, though card inclination is unchanged.

The "delta" arrangement of hoppers, in addition to eliminating stops and sharp turns along card path CP, also facilitates the desirable "broadside feed/serial process/broadside eject" transport mode aforementioned. Thus, at best seen in FIGURE 4, cards may be thrust downwardly (broadside) by picker P to be advanced past read head R serially and, thereafter, thrust transversely (broadside) by ejector E into output hopper 43 and also straightened in vertical inclination. It will be recognized by those skilled in the art that such a record handling apparatus is new and useful, having coplanar, converging "focused" hoppers arranged to improved operator access to machine elements and to shorten and straighten inter-hopper transport paths. Such improved access facilitates loading cards into or removing them from hoppers without disturbing continuous feeding and processing operations.

It will be appreciated that the above-described features of focusing convergence and coplanarity of card hoppers have advantageous inter-action. For instance, especially as seen with relation to FIGURES 3 and 7, these features enable an operator OP to manipulate the operative elements associated with card reader 41 from either of two positions (P*f* and P*r* in FIGURE 7) adjacent the machine center. It will be evident for instance from FIGURE 3 that locating output stacker base 430 at about waist level will, in turn, give machine 41 a low silhouette, allowing an operator to reach over to manipulate cards and controls from the rear (position P*r*), as well as from the front position (P*f*). This "bi-directional" operability of reader 41 increases the efficiency of the operator and improves the versatility of machine placement to a great extent. Thus, for example, operator OP may move from the front of reader 41 to the rear position (P*r*) to inspect or service elements located there, or to operate a companion card reader (similar to reader 41), without losing effective convenient control over reader 41. The invention thus facilitates the operation of a pair of card readers like reader 41 by a single operator.

TILTING

According to another feature of the invention, the input hopper 42 is tilted about its own longitudinal axis, to be V-shaped, having only one side rail. As will be more evident from consideration of FIGURES 3, 5 and 6, the input hopper 42 is according to the invention, tilted with respect to the horizontal, i.e. rotated about input axis AI, tending to tilt hopper 42 out of the horizontal plane (e.g. the plane of hopper base 430) and into the plane of inclination. This makes hopper 42 somewhat V-shaped, having only one siderail 51. Stated otherwise, hopper 42 comprises two bases, one base (420) preferably being relatively coplanar with the working surface 47 on the top of card reader 41. This eliminates one of the siderail portions of conventional input hoppers (e.g. side 11' of the machine in FIGURE 1). This may be best seen in FIGURE 5, which is an enlarged detail of the input hopper portion of the card reader embodiment shown in FIGURE 3. Thus, input hopper 42, simplified, may be thought of as comprising an extension (420) of inclined working surface 47 with an orthogonally projecting siderail 51 defining the hopper edge. It will be apparent that input hopper base 420 need not be so tilted merely to satisfy the above-mentioned constraints of convergence and inclination; i.e. input cards (stack SS1) could equally well be "misaligned" from their prescribed output-stack dimensional axes $v_o$, $h_o$ as indicated at $v_i$, $h_i$ by angles *y*, *a*, respectively without tilting input hopper base 420 toward the eject position and without making base 420 coplanar with surface 47. Without this tilting, however, so that base 420 pre-aims picked cards, it would not be possible to compact machine 41 vertically or to simplify card transport as indicated. For instance, so tilting base 420 pre-aims input cards so that they may be translated to ejector E unidirectionally, without disturbing the alignment of height axis $v_i$. Thus, base 420 defines a plane of inclination defined by the bases of cards at input hopper 42, at ejector E and therebetween.

It will be appreciated that the base 420 of hopper 42 being coplanar with working table 47, both surfaces will be similarly inclined with respect to the horizontal. It will be recognized that this tilting of input hopper 42 simplifies card transport between hoppers. More particularly, as seen from FIGURE 4, schematically, hopper base 420 is tilted so that the height axis $v_i$ of cards therein is inclined at angle *y* with respect to the "vertical" height axis $v_o$ of cards stacked along output base 430. Angle *y* is chosen so that the transport path (along axis *cp* in the plane of base 420) from input hopper 42 is aimed at the vicinity of the eject station, i.e. at the position of card $C_E$ above ejector E, cards being commonly vertically inclined along this path. Thus, when cards are thrust down by picker P to be aligned along transport axis *cp*, transport means (not shown) will advance them relatively unidirectionally (i.e. disorienting only one dimensional axis *h*) to be turned by pivot drum (transport roller) D and thence, positioned for ejection by ejector E. This "climbing" card-trajectory (from picker P to ejector E) obviously helps to straighten and shorten the transport path, eliminating cornering stops, accelerating card throughput, and the like.

Figures 5, 5A, 6:
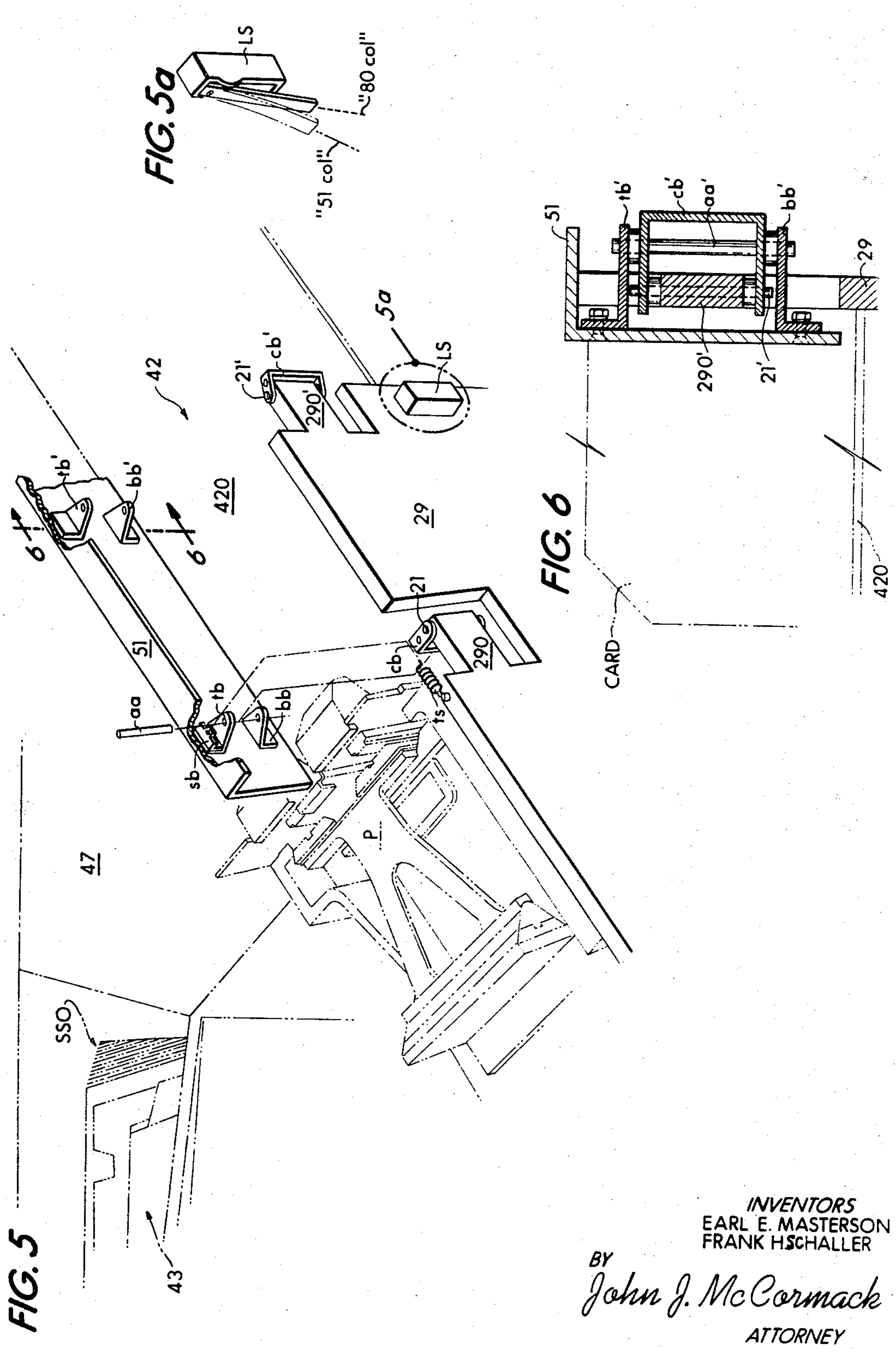
FIGURE 5 is an enlarged, detailed perspective view of an input hopper portion of the embodiment of FIGURE 3, with some parts exploded.
FIGURE 5A is a rear view of an element in FIGURE 5.
FIGURE 6 is a sectional elevation of FIGURE 5.

Tilting hopper 41 also facilitates making it V-shaped which, in turn, simplifies its construction, "opens" it up for easier access, and provides a more stable card "V-base." A V hopper is more stable in having two orthogonal bases, rather than one, for engagement of more card edge-area and for guidance in two directions. As seen in FIGURES 5 and 6, hopper rail 51 is pivotably mounted from a wall 29 which is rigidly joined to the main frame of card reader 41. Siderail 51 projects normally from hopper base 420 so that, together, they support two edges of the stacked cards in input hopper 42, rather than one edge, as is usual in the prior art (such as with hopper 1 in FIGURE 1). Thus, a card in "double-base" hopper 42 will tend to be self-aligning along two edges (long and short). Consequently, under the influence of gravity, the cards in hopper 42 may align themselves in the card plane (that is, along the long and short card dimensions) against base 420 and siderail 51 as well as along axis AI, against picker P. Moreover, the increased contact area between the cards and hopper 42 tends to level out the forces urging cards toward picker P so that card-advance is more gradual and controlled, than in the case where there is only a single-edge hopper contact. Since this dual-hopper-card contact serves to provide a steady, smooth, reduced load against the picker knives, it thereby relieves a common cause of jams, particularly when a long stack of cards is inserted in hopper 42. For instance, hopper 42 may be adapted to accept about *3000* cards, a quantity that can otherwise bear heavily against picker P so hard as to cause a jam. It will also be apparent that this tilted, V-hopper arrangement advantageously allows an operator to easily slide a card stack from working surface 47 into hopper 42 (i.e. base 420 thereof) with no (siderail) obstruction therebetween and no need to "joggle" the stack of cards so as to prealign them for insertion between chute walls.

This tilted, V-shape of an input hopper according to the invention, also provides improved access to cards adjacent the picker. Operators frequently encounter multilated cards, especially those used by the inexperienced public, such as charge receipts or other returnable media. At times, an operator will notice such a multilated card in an input stack as it approaches the picker and wish to inspect it and prevent it from causing a "mispick" or other feed-jam. Prior art machines which surround input cards with buffer stations and chute-sidewalls have made this virtually impossible, especially for small card stacks. For instance, with a prior art machine like machine 10 of FIGURE 1 above, it would require a burglar's agility to insert or remove cards adjacent picker 13, though such is often desirable. The invention provides open card-accessibility, however, such as by eliminating buffer stations, chute sidewalls, improving visibility and the like. Prior art card-feeding arrangements, like that shown in FIGURE 1, have commonly required these as aforesaid.

Another feature of the input hopper, according to the invention, is that the siderail 51 is made pivotable so that the width of hopper 42 may be conveniently adjusted, selectably, to accommodate a plurality of card sizes. More particularly, in the embodiment of FIGURES 5 and 6, rail 51 is shown pivotably attached to a pair of tongue portions 290, 290′ of a fixed wall 29, so as to be pivoted between a short card position (51-column card), and a long card position (80-column card). Rail 51 is pivotably carried by a pair of C-shaped brackets *cb*, *cb′* which are, in turn, pivotably journaled along a top edge of tongue portions 290, 290′ on a pair of common pivot axles 21, 21′ (shown projecting therefrom). Thus, brackets *cb*, *cb′* pivot about tongues 290, 290′ while rail 51 pivots (about common axles 21, 21′) relative to brackets *cb*, *cb′*. Wall 29 is cut-out to accommodate the rotation of brackets *cb*, *cb′* through the plane thereof. Rail 51 carries two projecting upper and lower rail bracket pairs, *tb*, *tb′* and *bb*, *bb′* respectively, these being rotatably mounted on axles *aa*, *aa′*, journaled through registering bores in brackets *cb*, *cb′*. A tension spring *ts* is mounted on wall 29 to engage rail 51 at a spring bracket *sb* thereon, to thereby urge rail 51 into one position or the other, "toggle-wise."

According to another feature of the invention, hopper 42 and pivotable siderail 51 thereon are adapted to actuate a machine-conditioning leaf switch LS during the pivoting excursions of rail 51. More particularly, switch LS (see FIGURE 5A also) is provided adjacent one of the C-shaped brackets (*cb′*) so as to be urged out of its "normal" (e.g. 80-column card) state and into its alternate (e.g. 51-column card) state to cause the application to machine elements of conditioning signals reflecting either the "51-column" or the "80-column" card state of input hopper 42. Thus, the pivoting of rail 51 into position for a given card size can also, automatically, precondition and prepare card-reader 41 to process such a card-size, for instance, by controlling transport means therein and the like.

The above-described feature whereby hopper base 420 is tilted may preferably be combined with a tilting of working surface 47, as noted, so as to make the two surfaces coplanar along a common "tilt-plane." Such an arrangement not only provides ready access from table 47 into hopper 42, walls therebetween having been removed, but also provides a working surface 47 which, being tilted so that its extremities are brought forward towards operator OP, provides more working area within the reach of the operator. For instance, such a tilted surface may carry a control panel (e.g. panel 46) mounted thereon to be within closer easy reach of operator OP; and also to be rendered clearly visible. This also helps to reduce the stretching and straining otherwise necessary for an operator to reach remote control points and contributes greatly to the "man-compatibility" of card handling machines according to the invention. It will be apparent that surface 47 provides a convenient surface for joggling and other operations. Also, such an arrangement greatly facilitates transferring cards from output hopper 43, across inclined table 47 and into tilted input hopper 42 in a single uninterrupted sweep, thus improving handling efficiency. Preferably hopper base 420 and coplanar table 47 are inclined at about 45° with respect to the vertical.

According to another feature of the invention, input hopper 42 is "doubly-inclined," i.e. is not only tilted to be V-shaped, but is also inclined downwardly to have its mid-section at about waist level, bringing both ends of the hopper within easy vertical reach. Thus, it will be noted from FIGURE 4 that input axis AI is inclined downwardly with respect to the horizontal, i.e. downward out of the plane of output hopper base 430 (plane of axis AO and projection P–AI). Thus, input axis AI (parallel to the join-line between base 420 and siderail 51) drops below the horizontal plane of output hopper base 430 by an inclination angle "*y*," preferably about 45° as aforesaid. Such an incline not only provides the conventional gravity card feed to picker P, but also allows the input hopper 42 to be swung in to be closer to operator OP and closer to output hopper 43, thus reducing the lateral distance, it would otherwise extend. Of course, as before stated, the mid-sections of input and output hoppers 42, 43 (that is, sections 42–M and 43–M) are kept relatively coplanar and working surface 47 is preferably also given this downward incline, so that all three surfaces are within convenient vertical reach.

Thus, in summary, according to a preferred form of the invention, hopper 42 is tilted in a compound manner to be both inclined downwardly, about 45° with respect to the vertical, and tilted or rotated about 45° about its own axis so as to be V-shaped, one siderail being eliminated. It is also preferred that an adjacent working surface intersect one base of the input hopper and preferably be made coplanar therewith, so that both assume the above-mentioned compound inclining and tilting attitude.

Figure 8:
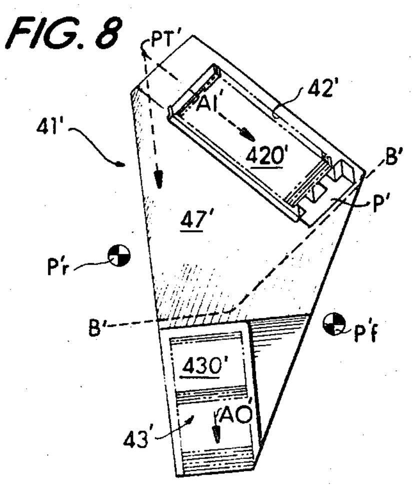
FIGURE 8 is a plan view of another embodiment, similar to that of FIGURE 7, but somewhat modified.

The invention may be better understood by reference to FIGURE 8 wherein an alternative embodiment of a card reader, i.e. reader 41′ is shown, similar to that shown in FIGURES 3–7, but with a somewhat modified hopper arrangement. Thus, alternate card reader 41′ includes a downwardly inclined input hopper 42′, an output hopper 43′ and an intermediate similarly-inclined work surface 47′. Input hopper 42′, as shown, directs stacked cards along an incline along input axis AI, down towards a picker means P′, whence the cards are thrust to be transported (path B'—B') past a processing station (not shown) and thereafter ejected along an output axis AO' in output hopper 43'. As with hopper 43, output hopper 43' includes a base portion 430' which is relatively horizontal (though it need not be, for instance being aligned along the same tilted plane as input base 420'), the mid-section of inclined input hopper 42' being relatively coplanar therewith. Input hopper 42' has a base portion 420' which is tilted downwardly, towards picker P', and rotated to be V-shaped, being tilted about its own axis AI', as well as being inclined from the horizontal. Working surface 47' is similarly tilted and inclined to be coplanar with hopper base 420'. Card reader 41' may be distinguished, however, from card reader 41 in that input and output axes AI' diverge from, rather than converging toward, a common point PT', establishing a "rightward turning" card path B'—B', similar to "leftward turning" path *cp* (in FIGURE 8). However, the hopper axes are still "convergent" as above defined. The axes emanating from, rather than toward, common focus PT'. In both types of embodiments, however, it will be appreciated that one of the card faces ("leading" or "trailing"—that is, front or rear faces) will both be oriented relatively toward this common reference-axis origin; for instance, such a "face-focusing" feature will present the "trailing" faces of the cards in input hopper 420' and output hopper 430' so that both face toward a common axis (through point PT'). Of course, where the trailing faces are so "focused" in an embodiment like FIGURE 8, the "leading" faces are likewise focused in other embodiments. It will likewise be recognized that, similar to reader 41, card reader 41' can be conveniently operated both from a front operator position $P'_f$ and also from a rear operator position $P'_r$.

In summary, it will be apparent that the invention above described provides improved, novel hopper and transport arrangements for card handling apparatus wherein a relatively "common-level" and convergently focused arrangement of hoppers provides improved lateral and vertical accessibility, as well as shortening and straightening internal card transport paths, both compacting the apparatus in a "delta" cross-section and lowering its silhouette. When, additionally, an input hopper is arranged to have one side removed and to be tilted into a V-shaped configuration, a further improvement in accessibility and transport mode is effected. When the input hopper is, moreover, inclined with respect to the horizontal to pre-aim injected cards and is also made coplanar with a similarly inclined and tilted machine-surface, it will be apparent that the machine is further compacted, that card advancement and picking is simplified and made more convenient, and that the machine organization is made more efficient. Thus, hopper focusing laterally pre-aims injected cards while tilting vertically pre-aims them; the hoppers thus being skewed relative one another. When the siderail of the input hopper is, even further, made pivotable and capable of automatically adjusting the machine for different card lengths, machine convenience and operation is evidently further improved. It will be apparent that the principles of this invention can be applied to other related apparatus for handling unit records.

Having now described the invention, what is claimed as novel and for which it is desired to secure Letters Patent is:

1. Unit record processing apparatus comprising:

a record input station; output stacking means having a stacker base; record eject means disposed operatively adjacent said output stacking means for diverting records thereto and arranged to maintain the height axes of said records aligned in a prescribed direction before diverting them; record advance means arranged to advance said records along a path between said input station and said eject means; and input stacking means disposed operatively adjacent said input station for directing records thereto while maintaining the height axes thereof in prescribed alignment and parallel with said direction, said input stacking means being arranged relative said stacker base for controlled injection of said records and being swung in convergently toward said output stacking means while being oriented to pre-aim said records to be translated relatively unidirectionally toward said eject means while maintaining said axes so aligned; said input and output stacking means thus being skewed relative one another and arranged so as to emanate in diverging directions from a common "reference-axis" locus, in the manner of spokes from a wheel-hub.

2. The combination as recited in claim 1:

wherein said input stacking means includes an input hopper base which is inclined to define a plane oblique to said stacker base and relatively orthogonal to said direction and wherein said input stacking means is oriented in pivoted relation with said output stacking means so as to keep said input hopper base in said plane while aiming said records to traverse said path relatively unidirectionally and to be acutely diverted toward said eject means while maintaining said axes parallel to said direction at said input stacking means.

3. The combination as recited in claim 2 wherein said input hopper base intersects the plane of said stacker base to maintain said stacking means disposed adjacent a common convenient vertical level.

4. Card handling apparatus comprising:

a card injection station; a card ejection station; card translation means for translating cards between said stations; output hopper means disposed adjacent said ejection station and input hopper means disposed adjacent said injection station so as to define a "delta" machine configuration with said hopper means oriented along respective skew directions, so that these directions emanate from adjacent a common origin-axis in the manner of spokes from a wheel-hub.

5. The combination as recited in claim 4 wherein said input hopper means and said translation means are disposed to maintain the height dimensions of said cards parallel between said stations.

6. The combination recited in claim 4 wherein said output hopper means is arranged to have a first alignment direction along which documents are adapted to be stacked, along a first stacking plane; wherein said translation means includes a stack station from which documents are to be fed into said output hopper means;

wherein said input hopper means is arranged to have a second alignment direction along which cards stacked therein will be urged, said second direction being arranged to focus convergently with said first direction at a focal point adjacent said apparatus, said input hopper means including a sloped surface disposed to be intersected by the said first plane, while extending along a second plane, obliquely tilted with respect to said first plane; said second plane being oriented to pre-aim cards in said input hopper means toward said stack station; wherein said input hopper means also includes a guide portion propecting normally from said surface and arranged to define said second direction with said surface; and wherein load-sensitive card selecting means are disposed operatively adjacent the lower end of said guide portion for receiving cards stack-aligned in said input hopper means, said selecting means being arranged to maintain said card so aimed toward said stack station.

7. The combination recited in claim 6 wherein said surface also extends to form a sloping card-handling surface on said apparatus, coplanar with said second input hopper plane.

8. The combination recited in claim 4 wherein said apparatus is adapted to process cards, transporting them relatively unidirectionally, with one dimension thereof in constant alignment, between a card picker means at said injection station and a card stacking means adjacent said ejection station; wherein said output hopper means is arranged to guide cards stacked therein along an output axis and includes a base portion along said first plane and a side portion projecting orthogonally therefrom to extend along the direction of said output stacking axis; wherein said input hopper means is adapted to guide cards in prescribed stacked alignment theretowards along an input axis, and includes a base surface along said second plane, being inclined downwardly towards said picker means at about 45° with respect to said output base portion; and wherein said input hopper also includes guide means projecting orthogonally from one edge of said base surface, said surface and guide means extending in double obliqueness relative said output base portion and being disposed so as to pre-aim cards picked therefrom relatively toward said output hopper means, said input and output axes being thereby arranged to focus convergently so as to diverge from a common origin adjacent said apparatus so that said apparatus thus assumes said "delta" configuration.

9. The combination as recited in claim 8 wherein said hopper means are operator-oriented and are disposed to intersect a common convenient height; and wherein said base surface of said input hopper means is extended to comprise a coplanar working surface which is similarly inclined and tilted on top of said apparatus.

10. A "delta" configuration card-handling apparatus as recited in claim 5 having a cross-sectionally triangular configuration, said translation means comprising part of card processing means having an input portion and an output portion; wherein said output hopper means is disposed operatively adjacent said output portion to direct cards therefrom along a prescribed output axis; wherein said input hopper means is disposed operatively adjacent said input portion to guide cards theretowards along a prescribed input axis; said axes being focused to diverge from a common origin adjacent the confines of said apparatus configuration, said hoppers being disposed to lie adjacent a common vertical level which facilitates operator access thereto from adjacent a common central operator position, said input hopper means comprising a pair of guide surfaces symmetrically tilted about said input axis to aim cards to be pre-aimed relatively towards said output portion.

11. Document handling apparatus having IN and OUT stations and transport means therebetween, said apparatus comprising:

output hopper means operatively disposed adjacent said OUT station and having a first alignment direction along which documents are adapted to be stacked along a first plane; input hopper means operatively disposed adjacent said IN station and having a second alignment direction along which documents are stacked therein, said second direction being arranged to focus convergently with said first direction at a focal point adjacent said apparatus, said input hopper having a portion thereof disposed to be intersected by the said first plane while extending along a second plane, obliquely tilted with respect to said first plane so as to urge said documents toward said IN station.

12. Record handling apparatus comprising:

record selection means; an input hopper inclined to direct records stacked therein along an input axis towards said selection means in prescribed alignment and having the height axes thereof aligned along a prescribed reference direction; an output hopper arranged to receive records originating from said selection means and adapted to urge said records in alignment along an output axis; and transport means arranged to advance said records between said selection means and said output hopper, said hoppers being arranged to intersect a common level and disposed so that said input and output axes are convergent for maintaining said height axes aligned along said direction until arrival adjacent said output hopper.

13. The combination recited in claim 12 wherein said output axis and the bases of records stacked therealong define an output plane, said records having their height axes in prescribed output alignment; and wherein said input axis is inclined oblique to said output plane at about 45°, so that said output alignment is inclined at about 45° from said direction.

14. The combination recited in claim 13 wherein said input and output axes diverge at about 45°.

15. Card handling apparatus comprising an input hopper arranged to gravity-urge cards along an input direction; an output hopper arranged to direct cards in alignment along an output direction, said hoppers being convergently focused so that said directions diverge from a common origin adjacent said apparatus; said hoppers further being relatively disposed so that said transport path therebetween can tolerate a total card deflection of as little as 45° with substantially no disorientation of card-height-axis.

16. Card handling apparatus adapted to process cards, transporting them between a card picker means and a card ejection-stacker means along a transport path therebetween, said apparatus including improved card-hopper means which renders card transit along said path relatively unidirectional without disturbing the alignment of one card dimensional axis, said hopper means comprising:

output hopper means disposed adjacent said stacking means and arranged to guide cards along an output axis, said output hopper means including a base portion and a side portion projecting orthogonally therefrom to extend parallel to said output stacking axis; and input hopper means disposed adjacent said picker means for guiding cards in prescribed stacked alignment theretowards along a downwardly inclined input axis, and including base means inclined downwardly with respect to said base portion of said output hopper, said input and output axes, being arranged to focus convergently so that the directions thereof diverge from a common origin adjacent said apparatus and so as to pre-aim picked cards toward said stacker means.

17. The combination as recited in claim 16 wherein said hopper means are operator-oriented, being disposed to intersect a common convenient height.

18. The combination as recited in claim 17 wherein said base means inclines downwardly at about 45° with respect to said base portion.

19. A card handling apparatus including card selection means, card ejection means and card transport means disposed operatively therebetween, the improvement therewith comprising a skewingly-disposed hopper arrangement including:

output hopper means operatively disposed adjacent said ejection means and arranged to guide cards therefrom along a prescribed output axis; and input hopper means operatively disposed adjacent said selection means for automatically directing cards thereto in prescribed alignment along a prescribed input axis and so as to maintain the height axes thereof parallel with that of cards at said ejection means.

20. A method for compacting card handling apparatus, including an input station and associated input hopper means and an output station and associated output hopper means, said method comprising the steps of:

tilting said input hopper means to be inclined so that cards therein are self-aligning toward said input station, the base of said input hopper means defining a plane of inclination; and swinging said input hopper means in toward said output hopper means so their axes converge, while maintaining said base in said plane and while keeping said input hopper means oriented so as to pre-aim cards at said input station relatively toward said output station.

21. The method as recited in claim 20 including the additional steps of:

disposing said hopper means to lie adjacent a common vertical level and disposing said input hopper means and said output station so that cards passing therebetween may assume a common vertical inclination.

22. In a punched card handling apparatus adapted to handle punched cards or like unit records for data processing purposse, the combination therewith comprising: card picker means, in-hopper means including an input base and associated side-rail adapted to store records stacked in prescribed alignment and direct them to said picker means along a respective in-feed direction; out-hopper means including an output base adapted to support records stacked along a prescribed out-feed direction; eject means adapted to translate processed records from a prescribed eject-station into said out-hopper means; both said hopper means being arranged to define a "delta-shaped" profile, with said respective hopper feed directions tending to converge adjacent a common operating zone; said output base being disposed adjacent a prescribed operating level; said input base having its surface laterally extended beyond the confines of the hopper so as to establish a record manipulating surface even when the in-hopper means is full to capacity; said input base, further, being inclined vertically to intersect an operating level adjacent the elevation of said output base and so as to pre-aim picked records relatively toward said eject station.

23. The combination as recited in claim 22 wherein said hopper feed directions tend to converge adjacent a single operator position and intersect operating levels which are in close proximity to a convenient operator-handling level; and wherein both the input base and output base are tilted at relatively the same angle so that records therein sit on respective rest planes which are substantially coplanar.

References Cited

UNITED STATES PATENTS

| | | | |
|---|---|---|---|
| 699,975 | 5/1902 | Reynolds | 271—10 |
| 2,359,670 | 10/1944 | Page | 209—110 |
| 2,777,690 | 1/1957 | Davidson | 271—61 X |
| 2,833,474 | 5/1958 | Wilson et al. | 235—61.11 |
| 2,865,154 | 12/1958 | Coyne. | |
| 3,098,249 | 7/1963 | Tice et al. | 271—3 X |
| 3,116,922 | 1/1964 | Coanet | 271—3 |
| 3,150,874 | 9/1964 | Zinke | 271—3 X |
| 3,259,239 | 7/1966 | Elliott | 271—62 X |

EDWARD A. SROKA, *Primary Examiner.*

U.S. Cl. X.R.

271—10

UNITED STATES PATENT OFFICE

CERTIFICATE OF CORRECTION

Patent No. 3,416,788

December 17, 1968

Earl E. Masterson et al.

It is certified that error appears in the above identified patent and that said Letters Patent are hereby corrected as shown below:

Column 14, line 63, "propecting" should read -- projecting --. Column 15, line 33, claim reference numeral "5" should read -- 4 --. Column 16, line 15, claim reference numeral "13" should read -- 12 --; line 53, claim reference numeral "17" should read -- 16 --. Column 17, line 16, "purposse" should read -- purposes --.

Signed and sealed this 24th day of March 1970.

(SEAL)
Attest:

Edward M. Fletcher, Jr.
Attesting Officer

WILLIAM E. SCHUYLER, JR.
Commissioner of Patents